UNITED STATES PATENT OFFICE.

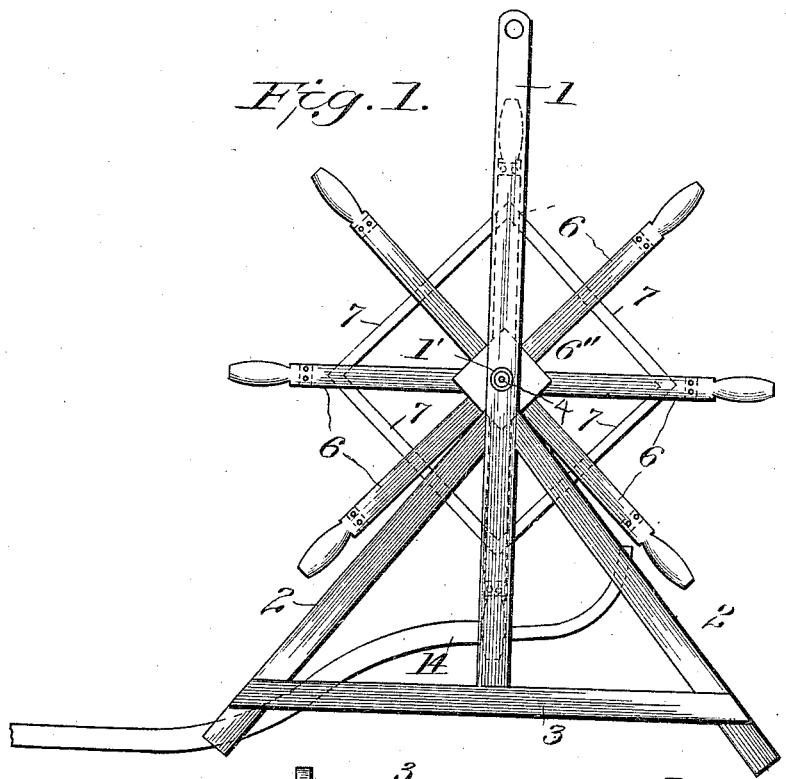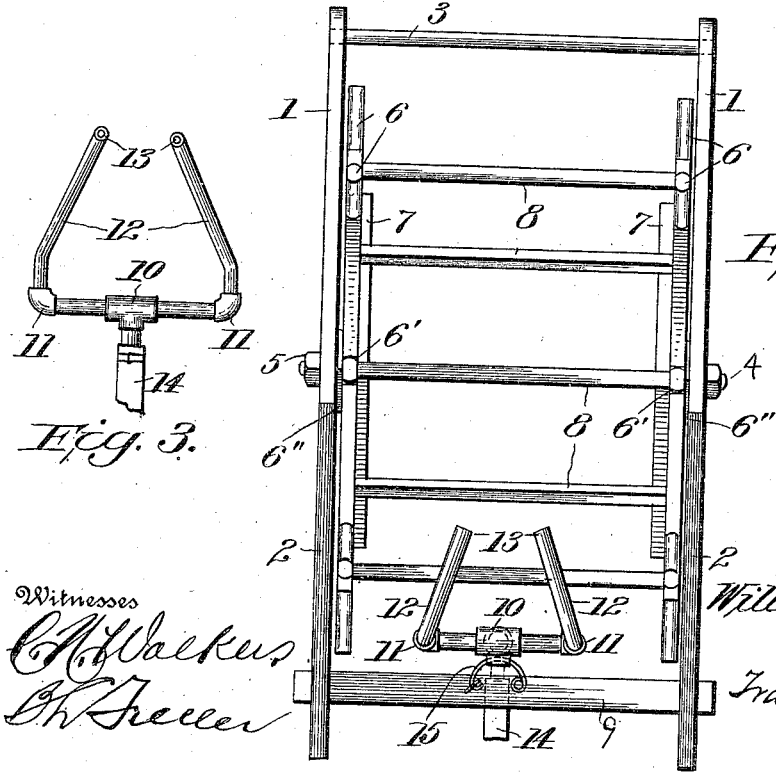

WILLIAM H. MERITHEW, OF CARTERVILLE, MISSOURI.

WATER-HOSE REEL AND SPRAY.

973,286.

Specification of Letters Patent. Patented Oct. 18, 1910.

Application filed November 4, 1909. Serial No. 526,305.

*To all whom it may concern:*

Be it known that I, WILLIAM H. MERITHEW, a citizen of the United States, residing at Carterville, in the county of Jasper and State of Missouri, have invented certain new and useful Improvements in Water-Hose Reels and Sprays, of which the following is a specification.

My invention relates to new and useful improvements in water hose reels and sprays.

The objects of my invention are to provide a convenient, economical and efficient watering device for lawns and gardens, that can be readily moved from place to place, and furnish a spray of enlarged capacity. I attain these objects by the novel mechanism illustrated in the accompanying drawings, in which—

Figure 1, is an end view of the device, showing hose connections. Fig. 2, is a side view of the same, with the hose removed. Fig. 3, is a detail view of the spray device.

Similar letters refer to similar parts throughout the several views.

The standards, 1, braces 2, and cross-braces 3, constitute the framework of the device.

4 is a revoluble shaft, loosely journaled in the standards 1, and upon which the spokes are mounted, as hereinafter detailed.

Approximately central of the standards 1, longitudinally, are suitable openings 1', in which the ends of the revoluble shaft 4, are inserted and held in position by nuts, 5, at each end.

6 are spokes, provided with openings 6', in which the ends of the revoluble shaft 4 are inserted, and are held in position by the spindle or hub block 6'', located on the interior of the standards, 1. These spokes are secured in relative position by suitable braces, 7, conveniently attached thereto adjacent to the ends thereof.

8 are cross-arms or slats, extending transversely between the spokes 6, to which they are secured by ordinary nails or bolts and connecting the same, forming the hose reel and paddles against which the water strikes in issuing from the nozzles of the spray device, in the operation of the machine.

A cross-brace, 9, is suitably secured to the base of the standards 1, by means of nails or bolts, and is adapted to support the spray device as hereafter detailed.

10 is a T pipe, to each end of which is attached an elbow, 11, with arms, 12, extending upwardly, inwardly inclined as they ascend, and capped with nozzles, 13. To the stem end of the T pipe may be joined an ordinary hose, as at 14. The spraying device thus formed is secured in operative position to the cross-brace 9, by means of an ordinary staple and hook, 15, immediately beneath the transverse slats 8 of the reel, the arms 12 extending upwardly within a short distance of the slats 8, so positioned that water forced through the nozzles 13, will strike the lower surface of the slats, imparting motion thereto.

Having described the construction of my device in detail, its use as a hose reel is obvious, and in using it as a spray, the hose is removed from the reel, one end connected to the water supply pipe the other to the stem of the T pipe, 10, the spray device is secured to cross-brace 9 by the hook 15 immediately beneath the center of the reel's transverse slats 8, with the arms 12 extending upwardly in such position as to bring the nozzles 13 directly in line beneath the transverse slats, 8, the water forced through the nozzles strikes the lower surface of the transverse slats, setting the reel in motion, and the greater the momentum of the water the more rapid will be the reel's revolutions. The arms 12 are so adjusted in inclination, as to cause the streams passing out of the nozzles, 13, to separately strike the transverse slats, 8, but as the water passes the slats that portion of the two streams not striking the same, meets a short distance above them, causing a rapid and complete distribution of the water, and as the upper surface of the slats come in contact with this water it throws it in profusion in all directions, and the more rapid the revolution of the reel the more delicate the spray. The rapidity of the revolution of the reel and the distribution of the spray required, can easily be regulated by manipulation of the water supply stops, in the ordinary manner.

What I claim and desire to secure by Letters Patent is;—

1. In a device of the character described, a hose reel, standards in which said reel is loosely mounted, said standards being supported by braces and transverse connecting arms, a T pipe loosely attached to one of the connecting arms by means of a hook and staple, an elbow at each end of the said T pipe, and inwardly inclined pipe arms extending upwardly from said elbows, substantially as set forth.

2. In a device for spraying and distributing liquid, the combination with a source of water supply, of a pipe communicating with the water supply, a T pipe provided with an elbow at each end and inwardly inclined pipe arms extending upwardly from said elbows, into which the pipe discharges; and a hose reel and standards in which said reel is loosely mounted, said standards being supported by braces and transverse connecting arms to one of which connecting arms the said T pipe is loosely attached by means of a hook and staple, substantially as and for the purposes described.

In testimony whereof I affix my signature in presence of two witnesses.

WILLIAM H. MERITHEW.

Witnesses:
    EARL E. McCLARY,
    CLIFFORD WEES.